Patented Feb. 5, 1924.

1,482,479

UNITED STATES PATENT OFFICE.

ALWIN MITTASCH AND CARL KIRCHER, OF LUDWIGSHAFEN-ON-THE-RHINE, GERMANY, ASSIGNORS, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

MANUFACTURE OF A NONHYGROSCOPIC FERTILIZER.

No Drawing. Application filed September 21, 1920. Serial No. 411,854.

*To all whom it may concern:*

Be it known that we, ALWIN MITTASCH and CARL KIRCHER, citizens of the German Republic, residing at Ludwigshafen-on-the-Rhine, Germany, have invented new and useful Improvements in the Manufacture of a Nonhygroscopic Fertilizer, of which the following is a specification.

We have found that a compound fertilizer of highly valuable properties can be produced from ammonium nitrate and ammonium sulfate and that a very simple and cheap method of obtaining said product consists in mixing the two salts above referred to in the solid state and in the presence of a restricted quantity of moisture so that the mixture contains approximately from 3 to 5 per cent of water. In spite of the high solubility of the two salts a dry nonhygroscopic mixed salt which at any time can be strewn, will thus result at once or after a short storage, whilst ammonium nitrate alone or its mixture with ammonium chlorid with the same contents of water would be moist, highly deliquescent and but insufficiently suitable for strewing purposes.

The two salts may be employed in about equal proportions which may be departed from within considerable limits, but for each 100 parts of ammonium nitrate not essentially less than 75 parts of ammonium sulfate should, generally, be present. The moisture may be contained in either of the two salts or in both of them in such quantities that the contents of water present in the final product is within the aforementioned limits.

For example, centrifuged ammonium nitrate containing 4 per cent of moisture is mixed with the same quantity of ammonium sulfate containing 2 per cent of water and a dry mixture which at any time can easily be strewn is obtained at once or after storing for a short time.

What we claim is:—

1. The process of producing a nonhygroscopic fertilizer by mixing solid ammonium nitrate with solid ammonium sulfate in the presence of moisture.

2. The process of producing a nonhygroscopic fertilizer by mixing about equal parts of solid ammonium nitrate and of solid ammonium sulfate in the presence of a restricted quantity of water, so that the moisture contained in the mixture does not essentially exceed 4 per cent.

3. As a new article of manufacture, a compound, nonhygroscopic fertilizer comprising ammonium nitrate and ammonium sulfate in about equal proportions and approximately from 3 to 5 per cent of water.

In testimony whereof we have hereunto set our hands.

ALWIN MITTASCH.
CARL KIRCHER.